(12) United States Patent
Revadigar et al.

(10) Patent No.: US 12,079,618 B2
(45) Date of Patent: Sep. 3, 2024

(54) METHOD FOR MANAGING SOFTWARE VERSIONS OF ELECTRONIC DEVICE(S) IN A VEHICLE AND RELATED DEVICE

(71) Applicant: HUAWEI TECHNOLOGIES CO., LTD., Guangdong (CN)

(72) Inventors: Girish Revadigar, Singapore (SG); Hsiao-Ying Lin, Boulogne Billancourt (FR); Zhuo Wei, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 17/854,441

(22) Filed: Jun. 30, 2022

(65) Prior Publication Data
US 2022/0334824 A1    Oct. 20, 2022

Related U.S. Application Data

(63) Continuation of application No. PCT/CN2019/130807, filed on Dec. 31, 2019.

(51) Int. Cl.
G06F 8/65 (2018.01)
G06F 8/71 (2018.01)
H04L 67/00 (2022.01)

(52) U.S. Cl.
CPC .............. *G06F 8/65* (2013.01); *G06F 8/71* (2013.01); *H04L 67/34* (2013.01)

(58) Field of Classification Search
None
See application file for complete search history.

(56) References Cited

U.S. PATENT DOCUMENTS

| 8,209,678 | B2 | 6/2012 | Sadja et al. |
| 8,813,061 | B2 | 8/2014 | Hoffman et al. |
| 9,464,905 | B2 | 10/2016 | Lewis |
| 10,447,483 | B1 * | 10/2019 | Su ................... H04L 9/3226 |

(Continued)

FOREIGN PATENT DOCUMENTS

| CN | 104836828 A | 8/2015 |
| CN | 104951332 A | 9/2015 |

(Continued)

OTHER PUBLICATIONS

Shi Qingguo et al.,"OTA Upgrade Solution for Intelligent Networked Cars", Proceedings of the 2018 SAE-China Annual Conference, with an English machine translation, total 19 pages.

(Continued)

*Primary Examiner* — Marina Lee

(57) ABSTRACT

A method for managing software versions of an electronic device in a vehicle and a relevant device are disclosed. The method includes: transmitting an update bundle to a target vehicle; receiving an update response from the target vehicle, wherein the update response is used to indicate one or more patches which have been successfully installed among the N patches; updating a vehicle version tree corresponding to the target vehicle according to the update response to obtain an updated VVT. The technical solution provides a lightweight and efficient version control mechanism for maintaining the software versions for each of the electronic devices in a vehicle.

20 Claims, 6 Drawing Sheets

(56) References Cited

U.S. PATENT DOCUMENTS

| | | | | |
|---|---|---|---|---|
| 2014/0109075 | A1* | 4/2014 | Hoffman | G06F 11/1464 |
| | | | | 717/169 |
| 2014/0282470 | A1 | 9/2014 | Buga et al. | |
| 2015/0193220 | A1* | 7/2015 | Rork | G06Q 10/20 |
| | | | | 717/170 |
| 2016/0196131 | A1 | 7/2016 | Searle et al. | |
| 2017/0060559 | A1* | 3/2017 | Ye | G06F 8/65 |
| 2018/0336026 | A1* | 11/2018 | Park | H04L 67/34 |
| 2019/0007215 | A1* | 1/2019 | Hakuta | H04W 12/069 |
| 2019/0057214 | A1* | 2/2019 | Xia | H04W 12/06 |
| 2019/0155594 | A1* | 5/2019 | Nakaguma | G06F 9/445 |
| 2019/0179629 | A1* | 6/2019 | Roy | H03M 7/30 |
| 2020/0125355 | A1* | 4/2020 | Aust | G06F 8/65 |
| 2023/0094805 | A1* | 3/2023 | Sharma | G06F 8/65 |
| | | | | 717/172 |

FOREIGN PATENT DOCUMENTS

| | | |
|---|---|---|
| CN | 105978921 A | 9/2016 |
| CN | 107656749 A | 2/2018 |
| CN | 109375936 A | 2/2019 |
| CN | 110032382 A | 7/2019 |
| CN | 110262826 A | 9/2019 |
| CN | 110377306 A | 10/2019 |
| CN | 110377308 A | 10/2019 |
| CN | 110381138 A | 10/2019 |
| CN | 110392103 A | 10/2019 |
| WO | 1999034557 A1 | 7/1999 |

OTHER PUBLICATIONS

Yang Huiqian, "Hybrid Electric Vehicle Electrical Control System Research", Hunan University, 2012 Issue 03, with an English abstract, total 168 pages.
AUTOSAR Specification of Update and Configuration Management, Release 17-10, 2017, total 13 pages.
Wei Si et al., "A Robust Load Balancing and Routing Protocol for Intra-Car Hybrid Wired/Wireless Networks", IEEE Transactions on Mobile Computing, vol. 18, No. 2, Feb. 2019, total 14 pages.
International Search Report and Written Opinion issued in PCT/CN2019/130807, dated Aug. 31, 2020, 10 pages.
Office Action issued in CN201980059871.1, dated Sep. 27, 2021, 16 pages.
Notice of Allowance issued in CN201980059871.1, dated Mar. 2, 2022, 5 pages.

* cited by examiner

US 12,079,618 B2

METHOD FOR MANAGING SOFTWARE VERSIONS OF ELECTRONIC DEVICE(S) IN A VEHICLE AND RELATED DEVICE

CROSS-REFERENCE TO RELATED APPLICATION

This application is a continuation of International Application No. PCT/CN2019/130807, filed on Dec. 31, 2019, the disclosure of which is hereby incorporated by reference in its entirety.

TECHNICAL FIELD

Embodiments of the present invention relate to the field of information technologies, and more specifically, to a method for managing software versions of electronic device(s) in a vehicle and a related device.

BACKGROUND

Modern cars/vehicles are equipped with hundreds of electronic devices from different manufacturers. Each electronic device is different, and performs a specific operation. Software in the electronic device controls the operation.

A supplier of electronic device(s) submits a software patch to an over-the-air (OTA) server. The OTA server forwards the software patch to the vehicle. The corresponding electronic device in the vehicle installs the software patch. Currently, the OTA sever does not have a mechanism for monitoring and maintaining software for the electronic devices in the vehicle.

SUMMARY

Embodiments of this application provide a method for managing software versions of electronic device(s) in a vehicle and a relevant device. The technical solution provides a lightweight solution for software version control of the electronic devices in a vehicle.

According to a first aspect, an embodiment of this application provides a method for managing software versions of electronic device(s) in a vehicle, including: transmitting, by a server, an update bundle to a target vehicle, wherein the update bundle includes N patches, the N patches being in one-to-one correspondence with N electronic devices in the target vehicle, each patch of the N patches being used to update software of a corresponding electronic device, N being a positive integer greater than or equal to 1; receiving, by the server, an update response from the target vehicle, the update response being used to indicate one or more patches which have been successfully installed among the N patches; and updating, by the server, a vehicle version tree (VVT) corresponding to the target vehicle according to the update response to obtain an updated VVT, wherein the updated VVT includes multiple pieces of a first software information, a piece of the first software information includes identity information of an electronic device in the target vehicle and current software version numbers of the electronic device in the target vehicle.

The above-mentioned technical solution provides a lightweight and efficient version control mechanism for maintaining the software versions for each the electronic devices in a vehicle.

In a possible design, the method further includes: determining VVT information according to the updated VVT, wherein the VVT information is used to indicate the multiple pieces of the first software information included in the updated VVT; transmitting the VVT information to the target vehicle.

In a possible design, wherein the method further includes: determining a time stamp corresponding to the VVT information; and transmitting the time stamp to the target vehicle.

In a possible design, wherein the identity information of the electronic device in the target vehicle includes: a first piece of identity information, a second piece of identity information and a third piece of identity information, wherein the first piece of identity information is used to indicate an identity of a manufacturer of the electronic device in the target vehicle, the second piece of identity information is used to indicate an identity of a type of the electronic device in the target vehicle, and the third piece of identity information is used to indicate the electronic device in the target vehicle.

In a possible design, before transmitting the update bundle to the target vehicle, the method further includes: receiving the M patches from M providers, wherein the M patches are in one-to-one correspondence with M electronic devices in a vehicle of a target model, M is a positive integer greater than or equal to 1; storing the M patches; updating a global version tree, GVT, corresponding to the vehicle of the target model according to the M patches to obtain an updated GVT, wherein the updated GVT includes multiple pieces of a second software information, a piece of the second software information includes identity information of an electronic device in the vehicle of the target model and latest software version numbers of the electronic device in the vehicle of the target model, the model of the target vehicle is the target model; and determining the update bundle according to the updated GVT, wherein the M patches include the N patches.

In a possible design, the determining the update bundle according to the updated GVT, including: determining the N electronic devices according to the VVT and the updated GVT, wherein software version numbers of any one of the N electronic devices in the VVT are different from software version numbers of the respective electronic device in the updated GVT; and determining the update bundle, wherein software version numbers of the N electronic devices in the VVT and in the updated GVT are different.

In a possible design, before determining the update bundle according to the updated GVT, the method further includes: determining the M patches include at least one critical patch, and wherein determining the update bundle, includes: determining that the update bundle includes the at least one critical patch.

In a possible design, wherein the identity information of an electronic device in the vehicle of the target model includes: a fourth piece of identity information, a fifth piece of identity information and a sixth piece of identity information, wherein the fourth piece of identity information is used to indicate an identity of a manufacturer of the electronic device in the vehicle of the target model, the fifth piece of identity information is used to indicate an identity of a type of the electronic device in the vehicle of the target model, and the sixth piece of identity information is used to indicate the electronic device in the vehicle of the target model.

According to a second aspect, an embodiment of this application provides a method for managing software versions of electronic device(s) in a vehicle, characterized in including: receiving, by the vehicle, an update bundle from a server, wherein the update bundle includes N patches, the N patches being in one-to-one correspondence with N electronic devices, N being a positive integer greater than or equal to 1; transmitting, by the vehicle, the N patches to the N electronic devices; receiving, by the vehicle, N pieces of update feedback information, wherein a piece of update feedback information is used to indicate whether an electronic device which transmits the piece of update feedback information installed a patch corresponding to the electronic device; determining, by the vehicle, an update response according to the N pieces of update feedback information; and transmitting, by the vehicle, the update response to the server.

The above-mentioned technical solution provides a lightweight and efficient version control mechanism for maintaining the software versions for each the electronic devices in a vehicle.

In a possible design, the method further includes: obtaining VVT information from the server, wherein the software information is used to indicate wherein the VVT information is used to indicate at least one piece of a first software information, a piece of the first software information is used to indicate identity information of an electronic device and current software version numbers of the electronic device; and storing the VVT information.

In a possible design, the method further includes: obtaining a time stamp corresponding to the VVT information; and storing the time stamp.

In a possible design, wherein the identity information of the electronic device includes: a first piece of identity information, a second piece of identity information and a third piece of identity information, wherein the first piece of identity information is used to indicate an identity of a manufacturer of the electronic device, the second piece of identity information is used to indicate an identity of a type of the electronic device, and the third piece of identity information is used to indicate the electronic device.

According to a third aspect, an embodiment of this application provides a server, and the server has function of implementing the method in the first aspect. The function may be implemented by hardware, or may be implemented by hardware executing corresponding software. The hardware of the software includes one or more modules corresponding to the function.

According to a fourth aspect, an embodiment of this application provides a vehicle, and the vehicle has function of implementing the method in the second aspect. The function may be implemented by hardware, or may be implemented by hardware executing corresponding software. The hardware of the software includes one or more modules corresponding to the function.

According to a fifth aspect, an embodiment of this application provides a computer readable storage medium, including instructions. When the instructions runs on a computer, the computer is enabled to perform the method in the first aspect or any possible implementation of the first aspect.

According to a sixth aspect, an embodiment of this application provides a computer readable storage medium, including instructions. When the instructions runs on a computer, the computer is enabled to perform the method in the second aspect or any possible implementation of the second aspect.

According to a seventh aspect, a server is provided, including a processor, a memory, and a communications interface. The processor is connected to the memory and the communications interface. The memory is configured to store instructions, the processor is configured to execute the instructions, and the communications interface is configured to communicate with another network element under control of the processor. When the processor executes the instructions stored in the memory, the processor is enabled to perform the method in the first aspect or any possible implementation of the first aspect.

According to an eighth aspect, a vehicle is provided, including a processor, a memory, and a communications interface. The processor is connected to the memory and the communications interface. The memory is configured to store instructions, the processor is configured to execute the instructions, and the communications interface is configured to communicate with another network element under control of the processor. When the processor executes the instructions stored in the memory, the processor is enabled to perform the method in the second aspect or any possible implementation of the second aspect.

According to a ninth aspect, a system is provided, where the system includes: the server in the seventh aspect and the vehicle in the eighth aspect.

According to a tenth aspect, a chip system is provided, where the chip systems includes a memory and a processor, wherein the memory is configured to store a computer program, and the processor is configured to invoke the computer program from the memory and run the computer program, so that a server on which the chip is disposed performs the method in the first aspect or any possible implementation of the first aspect.

According to an eleventh aspect, a chip system is provided, where the chip systems includes a memory and a processor, wherein the memory is configured to store a computer program, and the processor is configured to invoke the computer program from the memory and run the computer program, so that a vehicle on which the chip is disposed performs the method in the second aspect or any possible implementation of the second aspect.

According to a twelfth aspect, a computer program product is provided, wherein when the computer program product runs on a server, the server is enabled to perform the method in the first aspect or any possible implementation of the first aspect.

According to a thirteenth aspect, a computer program product is provided, wherein when the computer program product runs on a vehicle, the vehicle is enabled to perform the method in the second aspect or any possible implementation of the second aspect.

According to a fourteenth aspect, an embodiment of this application provides a method for managing software versions of electronic device(s) in a vehicle, characterized in including: transmitting, by a server, an update bundle to a target vehicle, wherein the update bundle comprises N patches, the N patches being in one-to-one correspondence with N electronic devices in the target vehicle, each patch of the N patches being used to update software of a corresponding electronic device, N being a positive integer greater than or equal to 1; receiving, by the vehicle, the update bundle from the server and transmit an update response to the server, wherein the update response is used to indicate one or more patches which have been successful installed among the N patches; receiving, by the server, the update response from the vehicle and update a vehicle version tree (VVT) corresponding to the vehicle according to the update response to obtain an updated VVT, wherein the updated VVT comprises multiple pieces of a first software information, a piece of the first software information comprises identity information of an electronic device in the vehicle and current software version numbers of the electronic device in the vehicle.

In a possible design, the method further includes: determining, by the server, VVT information according to the updated VVT and transmit the VVT information to the vehicle, wherein the VVT information is used to indicate the multiple pieces of the first software information comprised in the updated VVT; and obtaining, by the vehicle, the VVT information from the server and store the VVT information.

DESCRIPTION OF EMBODIMENTS

The following describes the technical solutions in this application with reference to the accompanying drawings.

Figure 1:
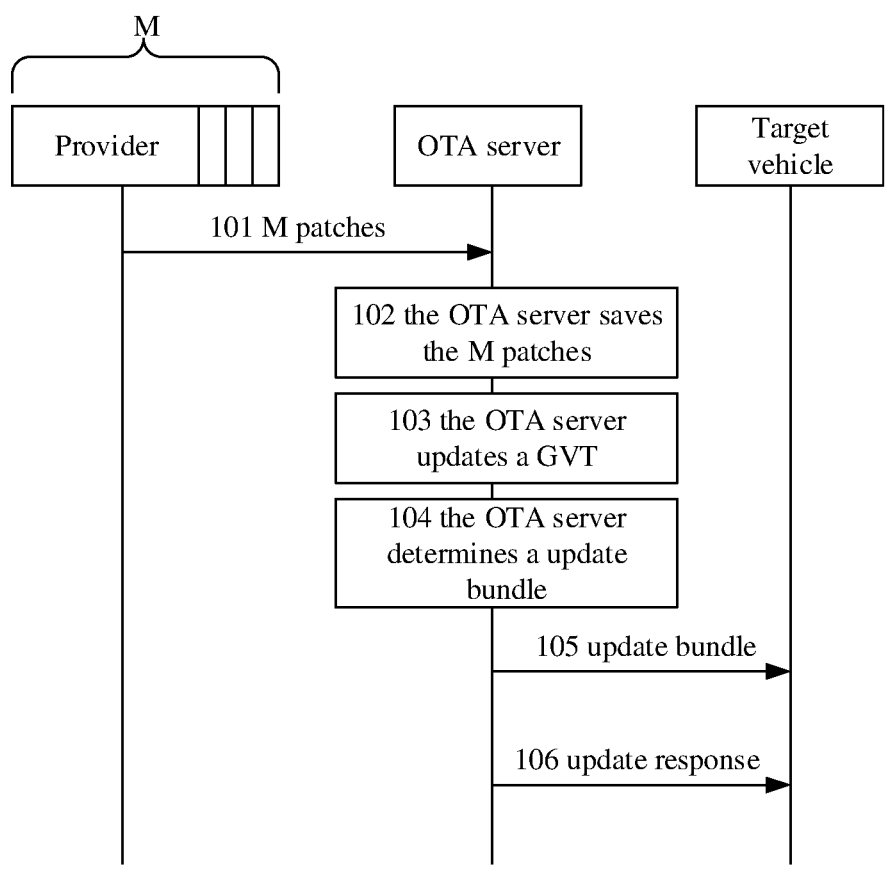
FIG. 1 is a flowchart of the embodiment of a method for managing software versions of electronic device(s) in a vehicle according to the present invention.

FIG. 1 is a flowchart of the embodiment of a method for managing software versions of electronic device(s) in a vehicle according to the present invention.

101, an OTA server receives M patches from M providers. Correspondingly, the M providers transmit the M patches to the OTA server.

The M patches are in one-to-one correspondence with M electronic devices in a vehicle of a target model, M is a positive integer greater than or equal to 1.

In some embodiments, the patch mentioned in the present application may also be referred as an update, an update packet or the like.

The target model refers to one particular type of car model. For example, the target model is BMW-series-2-2019 Q1. All cars of the target model have exactly same electronic devices.

The process of receiving a patch from a provider will be described in detail later.

102, the OTA server stores the M patches.

103, the OTA server updates a global version tree (GVT) corresponding to the vehicle of the target model according to the M patches to obtain an updated GVT.

Each car model has a corresponding GVT. For example, BMW-series-2-2019 Q1 corresponds to GVT 1, BMW-series-2-2016 Q2 corresponds to GVT 2. Different car models have different electronic devices. Therefore, GVTs corresponding to different car models include different information.

A piece of the second software information include identity information of an electronic device in the vehicle of the target model and software version numbers of the electronic device in the vehicle of the target model.

In some embodiments, the software mentioned in the present application may also be referred as a firmware.

For example, a format of the piece of the second software information may be [MFR_ID: Version], where MFR_ID is the ID to identify the type of the electronic device and manufacturer, and Version is the current software version of the electronic device.

For the GVT corresponding to the target model, the GVT has different versions. For example, the GVT that need to be updated in step 103 is version 1, and the updated GVT is version 2. For ease of description, the GVT that need to be updated in step 103 is referred to as GVT v1, and the updated GVT is referred to as GVT v2. Under this condition, step 103 can be interpreted as the OTA server updates GVT v1 according to the M patches to obtain GVT v2.

GVT v1 includes multiple pieces of a second software information. GVT v2 includes multiple pieces of the second software information. In some embodiments. For example, GVT v1 includes K pieces of the second software information, and GVT v2 includes K pieces of the second software information, K is a positive integer and greater than or equal to M.

For the GVT v1 and GVT v2, the software version numbers of the M electronic devices included in GVT v2 are different from the software version numbers of the M electronic devices included in GVT v1. The software version numbers of the M electronic devices included in GVT v2 are the latest software version numbers, and the software version numbers of the M electronic devices included in GVT v1 are the previous ones. If K is greater than M, the software version numbers of the K-M electronic devices included in GVT v2 will be the same as the software version numbers of the K-M electronic devices included in GVT v1.

Figure 2:
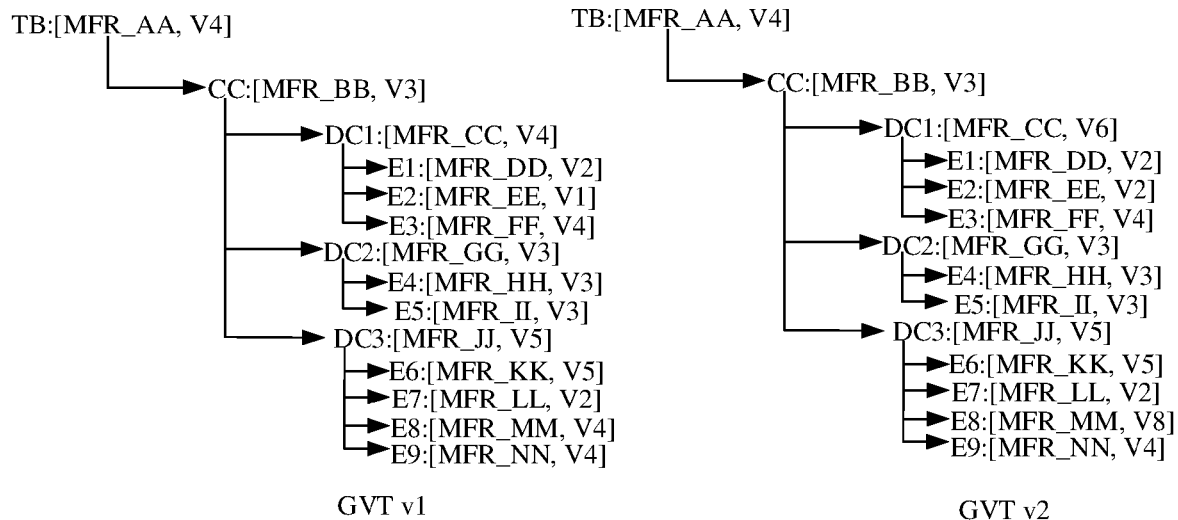
FIG. 2 shows the GVT v1 and the GVT v2.

FIG. 2 shows the GVT v1 and the GVT v2. TB, CC, DC (including DC1 to DC 3) and E (including E1 to E9) shown in FIG. 2 represent the telematics box, the central controller, the domain controller and the Electronic Control Units in the vehicle respectively.

Referring to FIG. 2, the software information corresponding to the DC1 included in the GVT v1 is different from the software information corresponding to the DC1 included in the GVT v2. More specifically, the software version numbers of the DC1 included in the GVT v1 are different from the software version numbers of the DC1 included in the GVT v2. The software version number of the DC 1 included in the GVT v1 is V4, and the software version number of the DC1 included in the GVT v2 is V6. Larger software version numbers indicate newer software versions. Therefore, the software version of DC1 included in the GVT v1 is older than the software version of DC1 included in the GVT v2.

Similarly, the software version numbers of the E2 and E8 included in the GVT v1 are different from the software version numbers of the E2 and E8 included in the GVT v2

104, the OTA server determines an update bundle according to the updated GVT, wherein the update bundle includes N patches, and N is a positive integer greater than or equal to 1.

Optionally, in some embodiments, according to the updated GVT, the OTA server determines that the software version numbers of M electronic devices have changed. Therefore, the OTA server may determines that the update bundle includes the M patches corresponding to the M electronics devices received in step 101. Under this condition, N equals M.

FIG. 2 is taken as an example. The update bundle include 3 patches which are used to update DC 1, E2 and E8.

Optionally, in some embodiments, according to the updated GVT, the OTA server determines that software version numbers of N critical electronic devices have changed. The OTA server also determines that software version numbers of M-N non-critical electronic devices have changed as well. Under this condition, the OTA server may determine that the update bundle includes the patches corresponding to the critical electronic devices. M is greater than N.

FIG. 2 is taken as an example. It is assumed that DC1 and E2 are critical electronic devices and E8 is a non-critical electronic device. The update bundle include 2 patches which are used to update DC1 and E2.

Optionally, in some embodiments, the OTA server may determines the update bundle according to the updated GVT and a vehicle version tree (VVT) corresponding to a target vehicle.

The OTA server stores a plurality of VVTs. The plurality of VVTs are in one-to-one correspondence with a plurality of vehicles. The model of the plurality of vehicles is the target model. The target vehicle is one of the plurality of vehicles.

The VVT corresponding to the target vehicle includes a plurality of pieces of a first software information. A piece of the first software information includes identity information of an electronic device in the target vehicle and current software version numbers of the electronic device in the target vehicle. A format of the piece of the first software information is similar to the format of the piece of the second software information. For example, the format of the piece of the first software information may be [MFR_ID, DEV_ID: Version], where MFR_ID is the ID to identify the type of the electronic device and manufacturer, DEV_ID is the unique ID of the electronic device, and Version is the current software version of the electronic device.

Optionally, in some embodiments, the determining, by the OTA server, the update bundle according to the updated GVT and the VVT corresponding to a target vehicle including: determining, by the OTA sever, N electronic devices, wherein the software version numbers of the N electronic devices in the updated GVT and the VVT are different; determining, by the OTA sever, the update bundle, wherein the updated bundle including N patches which are used to update the N electronic devices. If the N patches are installed successfully, the software version numbers of the N electronic devices in the target vehicle will be the same as the software version numbers of the N electronic devices in the updated GVT. In this case, N equals M.

Optionally, in some embodiments, the determining, by the OTA server, the update bundle according to the updated GVT and the VVT corresponding to a target vehicle including: determining, by the OTA sever, M electronic devices include N critical electronic devices, wherein the software version numbers of the M electronic devices in the updated GVT and the VVT are different; determining, by the OTA sever, the update bundle, wherein the updated bundle including N patches which are used to update the N critical electronic devices. If the N patches are installed successfully, the software version numbers of the N electronic devices in the target vehicle will be the same as the software version numbers of the N electronic devices in the updated GVT. In this case, N is less than or equal to M.

Optionally, in some embodiments, the OTA server may periodically check the difference between the updated GVT and the VVT of the target vehicle. If there is any difference between the updated GVT and the VVT of the target vehicle, the OTA server may determine the update bundle.

Optionally, in some embodiments, the OTA server may check if there is at least one critical patch in the M patches. If the M patches include one or more critical patches, the OTA server may determine the update bundle and the update bundle includes the one or more critical patches. If the M patches do not include the one or more critical patches, the OTA server will not determine the update bundle. In other words, the OTA server may only determine the update bundle after receiving at least one critical patch from the provider.

105, the OTA server transmits the update bundle to the target vehicle. Correspondingly, the target vehicle receives the update bundle from the OTA server.

As described above, the update bundle includes N patches. The N patches are in one-to-one correspondence with the N electronic devices in the target vehicle, each patch of the N patches is used to update software of a corresponding electronic device.

Optionally, in some embodiments, the OTA server may establish a secure channel with the target vehicle. More specifically, the OTA server may establish a channel with the target vehicle based on a security technique or protocol (e.g., Transport Layer Security (TLS), Secure Sockets Layer (SSL), Hypertext Transfer Protocol Secure (HTTPs), etc.). The update bundle may be transmitted on the secure channel.

Optionally, in some embodiments, before transmitting the update bundle to the target vehicle, the OTA sever may transmit notification information to the target vehicle. Correspondingly, the target vehicle receives the notification information. The notification information is used to indicate the target vehicle receives the update bundle. Optionally, the target vehicle may transmits notification response information to the OTA server. The notification response information is used to indicate that the target vehicle received the notification information and the target vehicle is ready to receive the update bundle. The OTA server transmits the update bundle to the target vehicle after receiving the notification response information.

The target vehicle include a plurality of electronic devices. The plurality of electronic devices includes the N electronic devices. In some embodiments, the plurality of electronic devices include one telematics box (TBox), one central controller (CC), a plurality of domain controllers (DC) and a plurality of Electronic Control Units (ECU).

Figure 3:
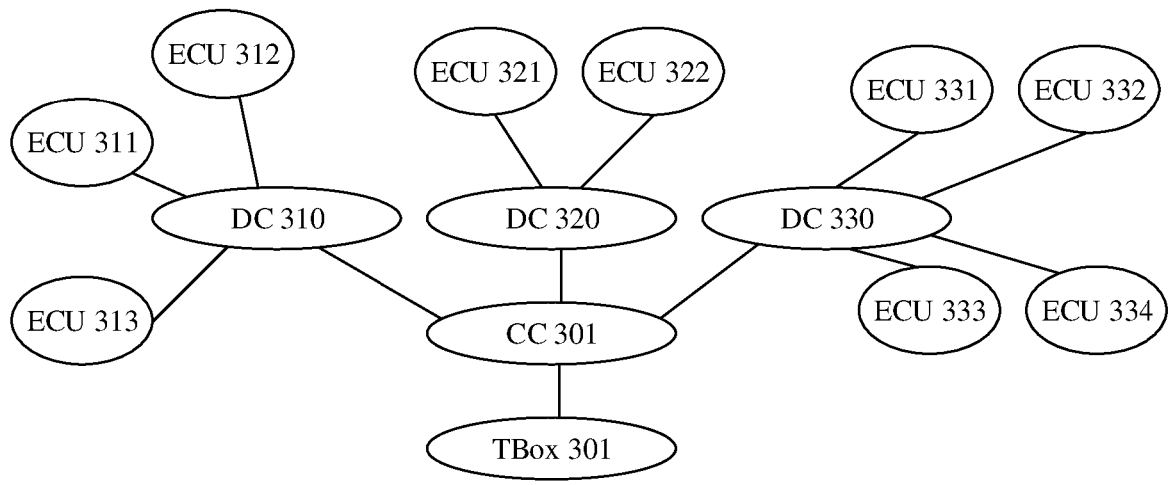
FIG. 3 is a schematic structural diagram of the target vehicle of the present invention.

FIG. 3 is a schematic structural diagram of the target vehicle of the present invention.

Referring to FIG. 3, the target vehicle includes TBox 301, CC 302, DC 310, DC 320 and DC 330. The target vehicle further includes ECU 311, ECU 312, ECU 313, ECU 321, ECU 322, ECU 331, ECU 332, ECU 333, and ECU 334. TBox 301 connects to CC 302. DC 310, DC 320 and DC 330 connect to CC 302. ECU 331, ECU 312 and ECU 313 connect to DC 310; ECU 321 and ECU 322 connect to DC 320; ECU 331, ECU 332, ECU 333 and ECU 334 connect to DC 330.

The TBox incorporates a wireless communication module. The TBox may communicates with the OTA server over any of wireless communication methods like Wireless Fidelity (WiFi), Long Term Evolution (LTE), 5 G and the like.

The TBox of the target vehicle receives the update bundle and transmits the update bundle to the CC.

Optionally, in some embodiments, a message carrying the update bundle may be protected by using a private key/public key pair of the TBox. For example, the OTA server may use the public key of the TBox to encrypt the message carrying the update bundle and transmit the encrypted message to the target vehicle. The TBox of the target vehicle may decrypt the encrypted message using a private key of the TBox to obtain the update bundle.

Optionally, in some embodiments, in addition to carrying the update bundle, the message may carry a Nonce. The TBox may check the Nonce carried in the message to verify the message is sent by the OTA server.

Optionally, in some embodiments, the message carrying the notification information may carry a Nonce. The TBox may check the Nonce carried in the message to verify the message is sent by the OTA server.

Optionally, in some embodiments, the message carrying the notification response information may carry a Nonce. The OTA server may check the Nonce carried in the message to verify the message is sent by the target vehicle.

Optionally, in some embodiments, the TBox may use a symmetric key $K_{TBox\_CC}$ to encrypt the update bundle and transmit the encrypted update bundle to the CC. The CC may use the symmetric key $K_{TBox\_CC}$ to decrypt the encrypted update bundle to obtain the N patches.

Optionally, in some embodiments, the TBox may forward the update bundle directly to the CC. In another word, the update bundle transmitted by the TBox is not encrypted.

Optionally, in some embodiments, the CC may use a symmetric key $K_{CC\_DC}$ to encrypt each of the N patches and transmit the encrypted patch to the corresponding electronic device. The corresponding electronic device may use the symmetric key $K_{CC\_DC}$ to decrypt the encrypted patch to obtain a corresponding patch.

Optionally, in some embodiments, the CC may forward the N patches directly to the corresponding electronic devices. In another word, the patch transmitted by the CC is not encrypted.

After receiving the patch, the electronic device may install the patch while the target vehicle is charging, parking or the like.

For example, the update bundle includes 3 patches. The 3 patches are used to update DC 310, ECU 311 and ECU 331 respectively. Under this condition, the CC may transmit the patches which are used to update DC 310 and ECU 311 to DC 310, and may transmit the patch which is used to update ECU 331 to DC 330. DC 310 may transmit the patch which is used to update ECU 311 to ECU 311. DC 330 may transmit the patch which is used to update ECU 331 to ECU 331. DC 310, ECU 311 and ECU 331 may install the received patch.

All above-mentioned embodiments assume that the N patches do not include a patch for the TBox and/or the CC. If the N patches include the patch for the TBox, the TBox will transmit an update bundle without the patch for the TBox to the CC. Similarly, if the updated bundle received by the CC includes the patch for the CC, the CC will transmit the patches for updating the DC and the ECU to the corresponding electronic devices.

106, the target vehicle transmits an update response to the OTA sever, wherein the update response is used to indicate one or more patches which have been successfully installed among the N patches.

After completing the patch installation process, the electronic device may send an update result to the upper electronic device. The update result is used to indicate if the electronic device successfully installed the received patch.

The upper electronic device of the ECU is the DC, the upper electronic device of the DC is the CC, and the upper electronic device of the CC is the TBox. Referring to FIG. 3, the upper electronic device of ECU 311, ECU 312 and ECU 313 is DC 310, the upper electronic device of ECU 321 and ECU 322 is DC 320, the upper electronic device of DC 310, DC 320 and DC 330 is CC 302, and the upper electronic device of CC 302 is TBox 301. The TBox may collect all update results and determine the update response. In some embodiments, the update response may indicate an electronic device which successfully installed the received patch and/or an electronic device which failed to install the received patch.

Optionally, in some embodiments, the update result transmitted by the ECU, the DC and or the CC may be encrypted by the transmitter. For example, the transmitter may encrypt the update result by using a symmetric key. After receiving the encrypted update result, the receiver may use the symmetric key to decrypt the encrypted update result.

Optionally, in some embodiments, the update response may be used to indicate whether the N patches have been successfully installed.

For example, in some embodiments, if the update response includes a first preset value (e.g. 0000), the OTA server may determine that each of the N electronic devices successfully installed the corresponding patch; if the update response includes a second preset value (e.g. 1111), the OTA server may determine that none of the N electronic devices successfully installed the corresponding patch.

In some embodiments, if the update response includes identity information of at least one electronic device (e.g. DEV_ID), the OTA server may determine that the at least one electronic device successfully installed the received patches, and may determine other electronic devices failed to install the received patches.

For example, the update bundle include 3 patches which are used to update DC 1, E2 and E8. If update response includes 0x03 and 0x008 (that is, the DEV_IDs of DC 1 and E8), the OTA server may determine that DC 1 and E8 successfully installed the received patches and E2 failed to install the received patch.

In some other embodiments, if the update response includes identity information of at least one electronic device, the OTA server may determine that the at least one electronic device failed to install the received patches, and may determine other electronic devices successfully installed the received patches.

For example, the update bundle includes 3 patches which are used to update DC 1, E2 and E8. If update response includes 0x03 and 0x008 (that is, the DEV_IDs of DC 1 and E8), the OTA server may determine that DC 1 and E8 failed to install the received patches and E2 successfully installed the received patch.

107, the OTA updates the VVT corresponding to the target vehicle according to the update response to obtain an updated VVT.

For ease of description, the VVT that needs to be updated in step 107 is referred to as VVT v1, and the updated VVT is referred to as VVT v2. Under this condition, the VVT is used to determine the update bundle is the VVT v1.

Figure 4:
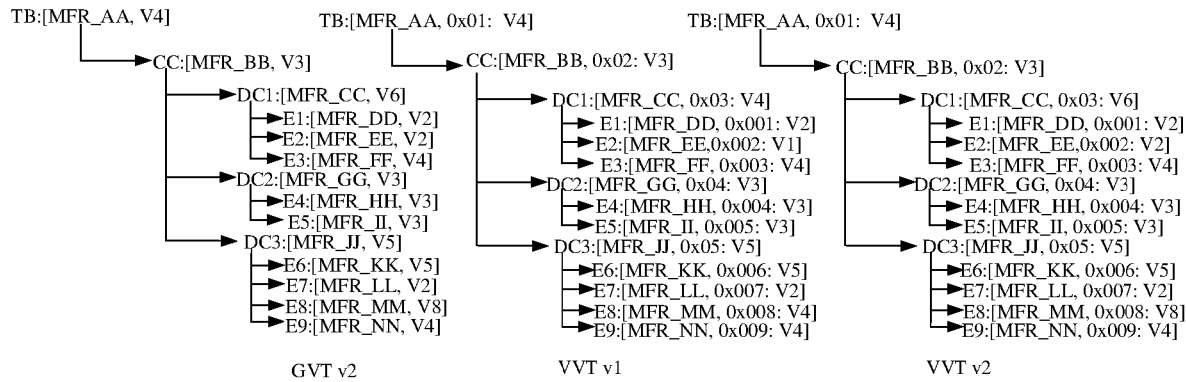
FIG. 4 shows the GVT v2, the VVT v1 and the VVT v2.

FIG. 4 shows the GVT v2, the VVT v1 and the VVT v2. TB, CC, DC (including DC1 to DC 3) and E (including E1 to E9) shown in FIG. 2 represent the telematics box, the central controller, the domain controller and the ECU respectively.

It is assumed that the updated bundle includes the patches for updating DC1, E2 and E8 and all of these electronic devices successfully installed the corresponding patches. Referring to FIG. 4, the software version number of DC1 in the VVT v1 is V4, the software version number of DC1 in GVT v2 is V6. Under this condition, the patch corresponding to DC1 included in the update bundle is used to update DC1 from version V4 to version V6. After installing the patch corresponding to DC1, the software version number of DC1 is updated to V6. Therefore, the current software version number of DC1 is V6. According to the update response, the OTA server may change the software version number of DC1 from V4 to V6. Therefore, the software version number of DC1 in the VVT v2 shown in FIG. 4 is V6.

Optionally, in some embodiments, the OTA server may determine VVT information according to the updated VVT (that is, the VVT v2) and transmit the VVT information to the target vehicle. The VVT information is used to indicate the multiple pieces of the first software information included in the VVT v2. Correspondingly, the target vehicle receives the VVT information and store the VVT information.

For example, the VVT information is a string with all pieces of the first software information in lexicographical order at each level. The VVT v2 shown in FIG. 4 is taken as an example. The VVT information M determined according to the VVT v2 shown in FIG. 4 is {[MFR_AA, 0x01: V4]|||[MFR_BB, 0x02: V3]|||[MFR_CC, 0x03: V6]|||[MFR_DD, 0x001: V2]|||[MFR_EE, 0x002: V2]|||[MFR_FF, 0x003: V4]|||[MFR_GG, 0x04: V3]|||[MFR_HH, 0x004: V3]|||[MFR_II, 0x005: V3]|||[MFR_JJ, 0x05: V5]|||[MFR_KK, 0x005: V5]|||[MFR_LL, 0x007: V2]|||[MFR_MM, 0x008: V6]|||[MFR_N, 0x009: V4]}.

Optionally, in some embodiments, a Persistent Segment Tree (PST) may be used to show the new and old versions of the VVT or the GVT.

Figure 5:
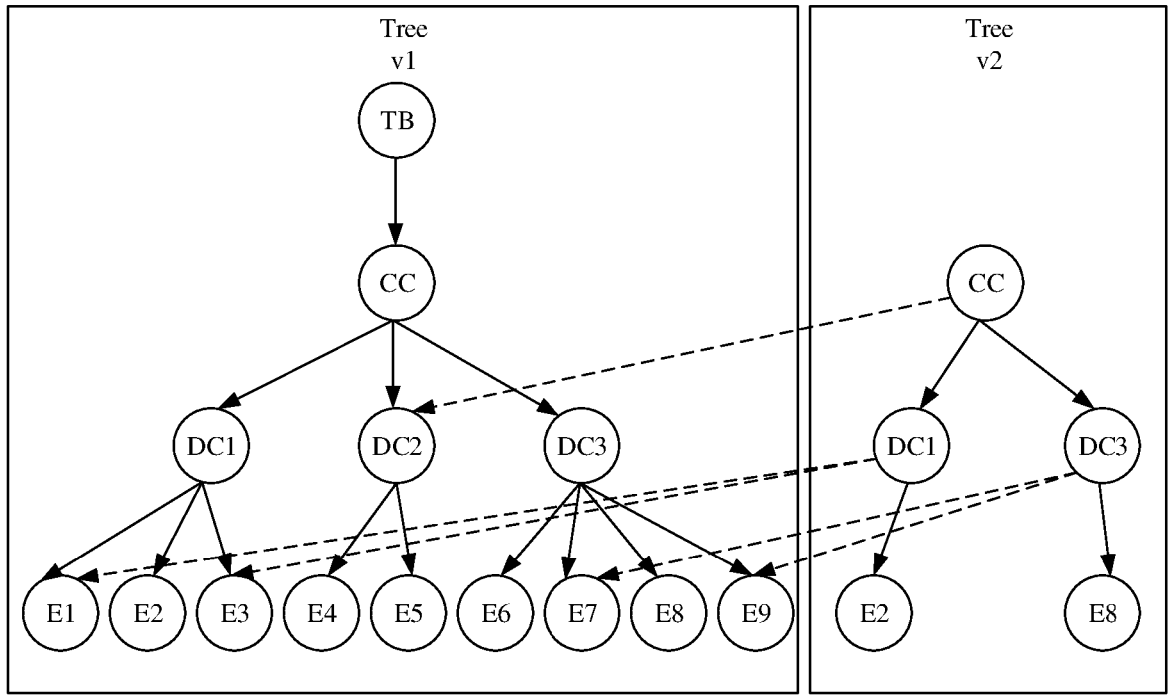
FIG. 5 shows a PST corresponding to the VVT v1 and VVT v2.

The VVT v1 and VVT v2 in FIG. 4 are taken as an example. FIG. 5 shows a PST corresponding to the VVT v1 and VVT v2. For ease of description, it is assumed that the software versions included in the VVT v1 are the software versions of the software installed in the factory. In other words, the target vehicle has never received an update packet before receiving the update packet including 3 patches for updating DC 1, E2, and E8.

Referring to FIG. 5, the PST includes Tree v1 and Tree v2. The Tree v1 corresponds to the VVT v1 shown in FIG. 4. The TB shown in the Tree v1 represents the first software information of the TBox in the VVT v1, the CC shown in the Tree v1 represents the first software information of the CC in the VVT v1, and so on.

The Tree v2 shown in FIG. 5 corresponds to the VVT v2 shown in FIG. 4. The CC shown in the Tree v2 represents the first software information of the CC in the VVT v1 shown in FIG. 4, the DC1 shown in the Tree v2 represents the first software information of the DC1 in the VVT v2 shown in FIG. 4, the DC3 shown in the Tree v2 represents the first software information of the DC3 in the VVT v1 shown in FIG. 4, the E2 shown in the Tree v2 represents the first software information of the E2 in the VVT v2 shown in FIG. 4, the E8 shown in the Tree v2 represents the first software information of the E8 in the VVT v2 shown in FIG. 4.

Tree v2 shown in FIG. 5 is another embodiment of the updated VVT. The updated VVT includes multiple pieces of the first software information. The multiple pieces of the first software information are in one-to-one correspondence with multiple electronic devices of the target vehicle. The multiple electronic devices include at least one first electronic device and at one second electronic device. The first electronic device is an electronic device of the target vehicle which has successfully installed a patch included in the update bundle received in step 105. The second electronic device is the upper electronic device of the first electronic device. For example, DC1, E2 and E3 are the first electronic devices, and CC and DC3 are the second electronic devices.

The OTA server may determine VVT information according to the Tree v2. In some embodiments, the VVT information is a string with the first information included in the Tree v2. Under this condition, the VVT information M is {[MFR_BB, 0x02: V3]|||[MFR_CC, 0x03: V6]|||[MFR_EE, 0x002: V2]|||[MFR_JJ, 0x05: V5]|||[MFR_MM, 0x008: V6]}. In some other embodiments, the VVT information is a string with the first software information of the updated electronic devices. Under this condition, the VVT information M is {[MFR_CC, 0x03: V6]|||[MFR_EE, 0x002: V2]|||[MFR_MM, 0x008: V6]}.

Similar to a VVT, the updated GVT includes multiple pieces of the second software information. The multiple pieces of the first software information are in one-to-one correspondence with multiple electronic devices of the vehicle of the target model. The multiple electronic devices include at least one third electronic device and at one fourth electronic device. The M patches include a patch for the third electronic device. The fourth electronic device is the upper electronic device of the third electronic device. Under this condition, the number of pieces of software information included in GVT v2 is different from the number of pieces of software information included in GVT v1.

Optionally, in some embodiments, the OTA server may store the VVT information. The VVT information may be stored in a log book or a table.

Optionally, in some embodiments, the OTA server may determine a time stamp corresponding to the VVT information and transmit the time stamp to the target vehicle. Correspondingly, the target vehicle receives the time stamp and store the time stamp with the corresponding VVT information.

In some embodiments, the time stamp may be incorporated in the VVT information. For example, the VVT information M determined according to the VVT v2 shown in FIG. 4 is {[MFR_AA, 0x01: V4]|||[MFR_BB, 0x02: V3]|||[MFR_CC, 0x03: V6]|||[MFR_DD, 0x001: V2]|||[MFR_EE, 0x002: V2]|||[MFR_FF, 0x003: V4]|||[MFR_GG, 0x04: V3]|||[MFR_HH, 0x004: V3]|||[MFR_II, 0x005: V3]|||[MFR_JJ, 0x05: V5]|||[MFR_KK, 0x005: V5]|||[MFR_LL, 0x007: V2]|||[MFR_MM, 0x008: V6]|||[MFR_N, 0x009: V4]|||Tv}, the VVT information M determined according to the Tree V2 shown in FIG. 5 is {[MFR_BB, 0x02: V3]|||[MFR_CC, 0x03: V6]|||[MFR_EE, 0x002: V2]|||[MFR_JJ, 0x05: V5]|||[MFR_MM, 0x008: V6]|||Tv}, wherein Tv is the time stamp. In another word, the time stamp is a part of the VVT information.

In some other embodiments, the time stamp is independent of the VVT information. In another word, the time stamp is not a part of the VVT information.

In some embodiments, the OTA server may use the public key of the target vehicle to encrypt the VVT information and transmit the encrypted VVT information to the target vehicle. The target vehicle may use the private key of the target vehicle to decrypt the encrypted VVT information to obtain the VVT information. Similarity, if the time stamp is independent of the VVT information, the OTA server may use the public key of the target vehicle to encrypt the time stamp and transmit the encrypted time stamp to the target vehicle. The target vehicle may use the private key of the target vehicle to decrypt the encrypted time stamp to obtain the time stamp.

In some embodiments, the OTA server may do not transmit the time stamp to the target vehicle. The target vehicle may determine the time stamp based on the time at which the VVT information was received and store the determined time stamp.

The above-mentioned technical solution provides a light-weight solution for software version control of the electronic devices in a vehicle. The OTA sever stores the current software information of the vehicle (that is, the VVT). Meanwhile, the OTA server and the vehicle store the update history (that is the VVT information). In addition, in some embodiments of the technical solution, the information transmitted between the OTA server and the vehicle is encrypted by using a public key of the receiver. Therefore, the technical solution provides a secure mechanism for maintaining the software of the electronic devices in the vehicle.

Figure 6:
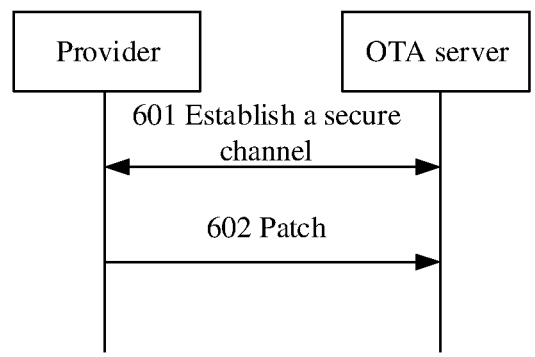
FIG. 6 is a flowchart of the embodiment of a method for receiving a patch from a provider according to the present invention.

FIG. 6 is a flowchart of the embodiment of a method for receiving a patch from a provider according to the present invention.

601, an OTA server may establish a secure channel with a provider.

For example, the OTA server may establish a channel with the provider based on a security technique or protocol (e.g., Transport Layer Security (TLS), Secure Sockets Layer (SSL), Hypertext Transfer Protocol Secure (HTTPs), etc.). The message transmitted by the OTA server or the provider may be transmitted on the secure channel.

602, the provider transmits a patch which is used to update software of an electronic device in a vehicle to the OTA server.

Optionally, in some embodiments, the patch transmitted by the provider may be protected by using a public key of the OTA server. For example, the provider may use the public key of the OTA server to encrypt the patch. The OTA server may decrypt the encrypted patch using a private key of the OTA server to obtain the patch.

Optionally, in some embodiments, in addition to carrying the patch, the message may carry a Nonce. The OTA server may check the Nonce carried in the message to verify the message is sent by the provider.

Optionally, in some embodiments, before transmitting the patch to the OTA server, the provider may transmit notification information to the OTA server. Correspondingly, the OTA server receives the notification information. The notification information is used to indicate the OTA server receives the patch. Optionally, the OTA server may transmits notification response information to the provider. The notification response information is used to indicate that the OTA server received the notification information and the OTA server is ready to receive the patch. The provider transmits the patch to the OTA server after receiving the notification response information.

Optionally, in some embodiments, the message carrying the notification information may carry a Nonce. The OTA sever may check the Nonce carried in the message to verify the message is sent by the provider.

Optionally, in some embodiments, the message carrying the notification response information may carry a Nonce. The provider may check the Nonce carried in the message to verify the message is sent by the OTA server.

Optionally, in some embodiments, the notification information may be encrypted by using the public key of the OTA server. The OTA may use the private key of the OTA server to decrypt the encrypted notification information.

Optionally, in some embodiments, the notification response information may be encrypted by using a public key of the provider. The provider may use a private key of the provider to decrypt the encrypted notification response information.

Figure 7:
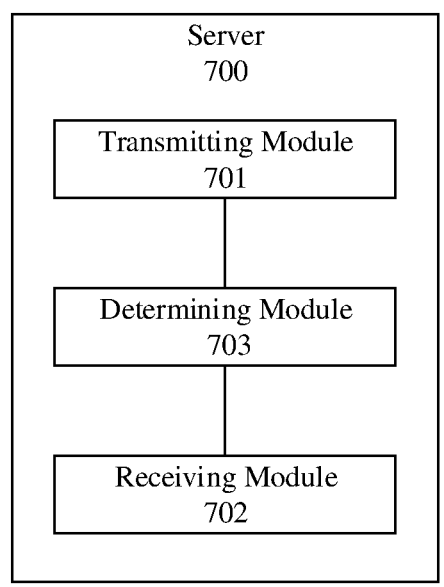
FIG. 7 is a schematic block diagram of a server 700 according to an embodiment of this application.

FIG. 7 is a schematic block diagram of a server 700 according to an embodiment of this application. As shown in FIG. 7, the server 700 includes: a transmitting module 701, a receiving module 702 and a determining module 703.

The transmitting module 701 is configured to transmit an update bundle to a target vehicle.

The update bundle includes N patches. The N patches are in one-to-one correspondence with N electronic devices in the target vehicle. Each patch of the N patches is used to update software of a corresponding electronic device. N is a positive integer greater than or equal to 1.

The receiving module 702 is configured to receive an update response from the target vehicle.

The update response is used to indicate one or more patches which have been successfully installed among the N patches.

The determining module 703 is configured to update a VVT corresponding to the target vehicle according to the update response to obtain an updated VVT.

The updated VVT includes multiple pieces of a first software information. A piece of the first software information includes identity information of an electronic device in the target vehicle and current software version numbers of the electronic device in the target vehicle.

Optionally, the determining module 703 is further configured to determine VVT information according to the updated VVT, wherein the VVT information is used to indicate the multiple pieces of the first software information included in the updated VVT; and the transmitting module 701 is further configured to transmit the VVT information to the target vehicle.

Optionally, the determining module 703 is further configured to determine a time stamp corresponding to the VVT information; and the transmitting module 701 is further configured to transmit the time stamp to the target vehicle.

Optionally, the identity information of the electronic device in the target vehicle includes: a first piece of identity information, a second piece of identity information and a third piece of identity information, wherein the first piece of identity information is used to indicate an identity of a manufacturer of the electronic device in the target vehicle, the second piece of identity information is used to indicate an identity of a type of the electronic device in the target vehicle, and the third piece of identity information is used to indicate the electronic device in the target vehicle.

Optionally, the receiving module 702 is further configured to receive the M patches from M providers, wherein the M patches are in one-to-one correspondence with M electronic devices in a vehicle of a target model, M is a positive integer greater than or equal to 1; and the determining module 703 is further configured to: store the M patches; update a global version tree, GVT, corresponding to the vehicle of the target model according to the M patches to obtain an updated GVT, wherein the updated GVT includes multiple pieces of a second software information, a piece of the second software information includes identity information of an electronic device in the vehicle of the target model and latest software version numbers of the electronic device in the vehicle of the target model, the model of the target vehicle is the target model; and determine the update bundle according to the updated GVT, wherein the M patches include the N patches.

Optionally, the determining module 703 is configured to determine the N electronic devices according to the VVT and the updated GVT, wherein software version numbers of any one of the N electronic devices in the VVT are different from software version numbers of the respective electronic device in the updated GVT; and determine the update bundle, wherein software version numbers of the N electronic devices in the VVT and in the updated GVT are different.

Optionally, the determining module 703 is further configured to determine the M patches include at least one critical patch, and the determining module 703 is specifically configured to determine that the update bundle includes the at least one critical patch.

Optionally, the identity information of an electronic device in the vehicle of the target model includes: a fourth piece of identity information, a fifth piece of identity information and a sixth piece of identity information, wherein the fourth piece of identity information is used to indicate an identity of a manufacturer of the electronic device in the vehicle of the target model, the fifth piece of identity information is used to indicate an identity of a type of the electronic device in the vehicle of the target model, and the sixth piece of identity information is used to indicate the electronic device in the vehicle of the target model.

It should be understood that the server 700 in this embodiment of this application may correspond to the OTA server in the above-mentioned embodiments, and the foregoing and other management operations and/or functions of the modules in the server 700 are separately used to implement corresponding steps of the foregoing methods. For brevity, details are not described herein again.

In this embodiment, the transmitting module 701 and the receiving module 702 may be implemented by a transceiver, and the determining module 703 may be implemented by a processor.

Figure 8:
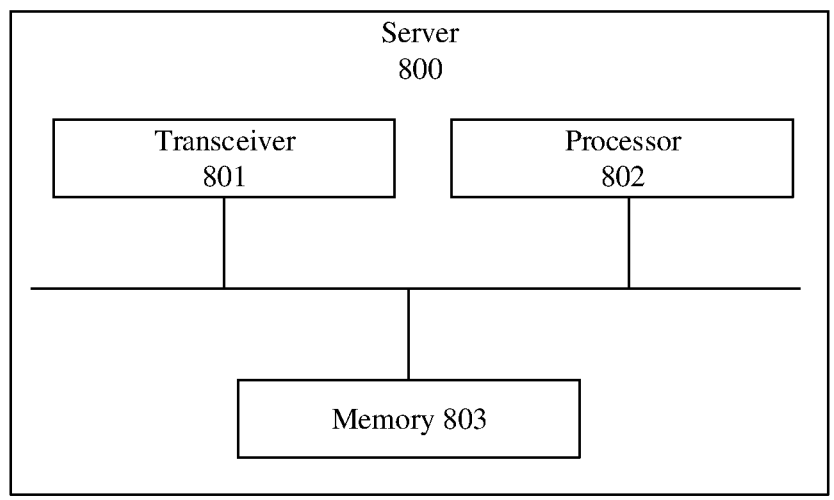
FIG. 8 is a schematic block diagram of a server 800 according to an embodiment of this application.

As shown in FIG. 8, a server 800 may include a transceiver 801, a processor 802, and a memory 803. The memory 803 may be configured to store code, instructions, and the like executed by the processor 802.

Figure 9:
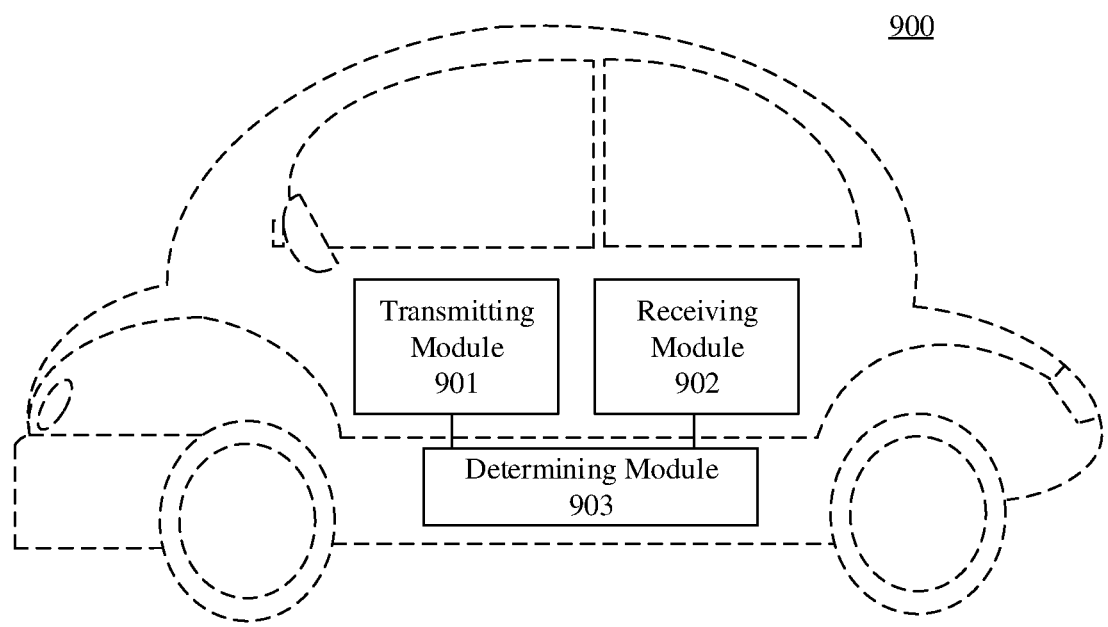
FIG. 9 is a schematic block diagram of a vehicle 900 according to an embodiment of this application.

FIG. 9 is a schematic block diagram of a vehicle 900 according to an embodiment of this application. As shown in FIG. 9, the vehicle 900 includes: a transmitting module 901, a receiving module 902 and a determining module 903.

The receiving module 902 is configured to receive an update bundle from a server.

The update bundle includes N patches. The N patches are in one-to-one correspondence with N electronic devices. N is a positive integer greater than or equal to 1.

The determining module 903 is configured to transmit the N patches to the N electronic devices.

The determining module 903 is further configured to receive N pieces of update feedback information.

A piece of update feedback information is used to indicate whether an electronic device which transmits the piece of update feedback information installed a patch corresponding to the electronic device.

The determining module 903 is further configured to determine an update response according to the N pieces of update feedback information.

The transmitting module 901 is configured to transmit the update response to the server.

Optionally, the receiving module 902 is further configured to obtain VVT information from the server, wherein the software information is used to indicate wherein the VVT information is used to indicate at least one piece of a first software information, a piece of the first software information is used to indicate identity information of an electronic device and current software version numbers of the electronic device; the determining module 903 is further configured to store the VVT information.

Optionally, the receiving module 902 is further configured to obtain a time stamp corresponding to the VVT information; the determining module 903 is further configured to store the time stamp.

Optionally, the identity information of the electronic device includes: a first piece of identity information, a second piece of identity information and a third piece of identity information, wherein the first piece of identity information is used to indicate an identity of a manufacturer of the electronic device, the second piece of identity information is used to indicate an identity of a type of the electronic device, and the third piece of identity information is used to indicate the electronic device.

It should be understood that the vehicle 900 in this embodiment may correspond to the target vehicle in the above-mentioned embodiments, and the foregoing and other management operations and/or functions of the modules in the vehicle 900 are separately used to implement corresponding steps of the foregoing methods. For brevity, details are not described herein again.

In this embodiment, the transmitting module 901 and the receiving module 902 may be implemented by a transceiver, and the determining module 903 may be implemented by a processor.

Figure 10:
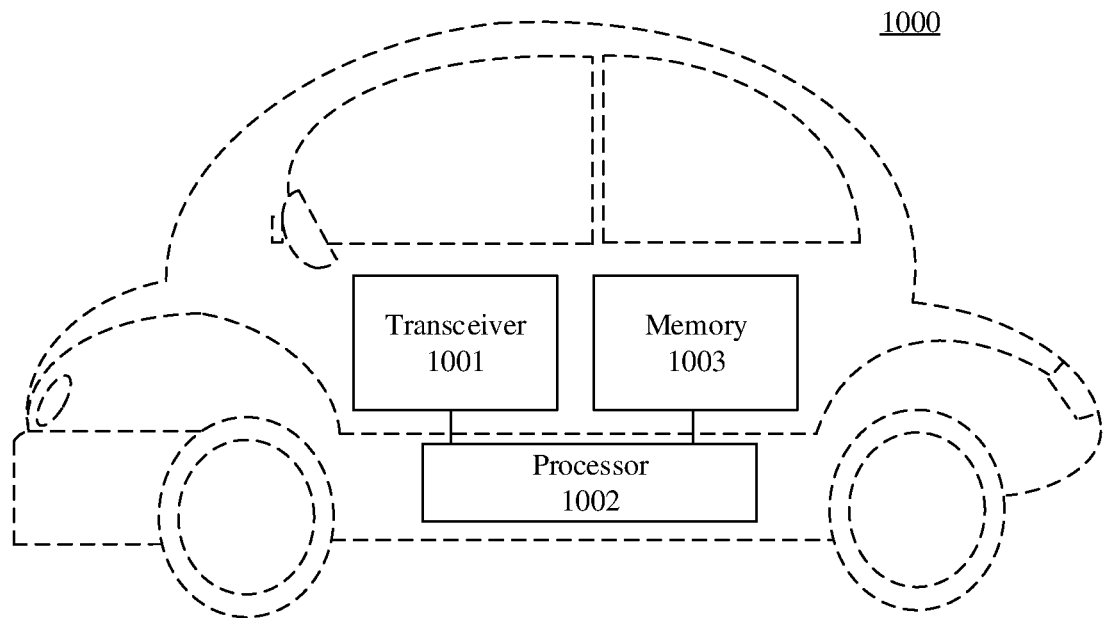
FIG. 10 is a schematic block diagram of a vehicle 1000 according to an embodiment of this application.

As shown in FIG. 10, a vehicle 1000 may include a transceiver 1001, a processor 1002, and a memory 1003. The memory 1003 may be configured to store code, instructions, and the like executed by the processor 1002.

It should be understood that the processor 802 or the processor 1002 may be an integrated circuit chip and has a signal processing capability. In an implementation process, steps of the foregoing method embodiments may be completed by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in the embodiments of the present invention. The general purpose processor may be a microprocessor, or the processor may be any conventional processor or the like. The steps of the methods disclosed with reference to the embodiments of the present invention may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware in the processor.

It may be understood that the memory 803 or the memory 1003 in the embodiments of the present invention may be a volatile memory or a nonvolatile memory, or may include both a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM) and is used as an external cache. By way of example rather than limitation, many forms of RAMs may be used, and are, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchronous link DRAM, SLDRAM), and a direct rambus random access memory (Direct Rambus RAM, DR RAM).

It should be noted that the memory in the systems and the methods described in this specification includes but is not limited to these memories and a memory of any other appropriate type.

An embodiment of this application further provides a system chip, where the system chip includes an input/output interface, at least one processor, at least one memory, and a bus. The at least one memory is configured to store instructions, and the at least one processor is configured to invoke the instructions of the at least one memory to perform operations in the methods in the foregoing embodiments.

Figure 11:
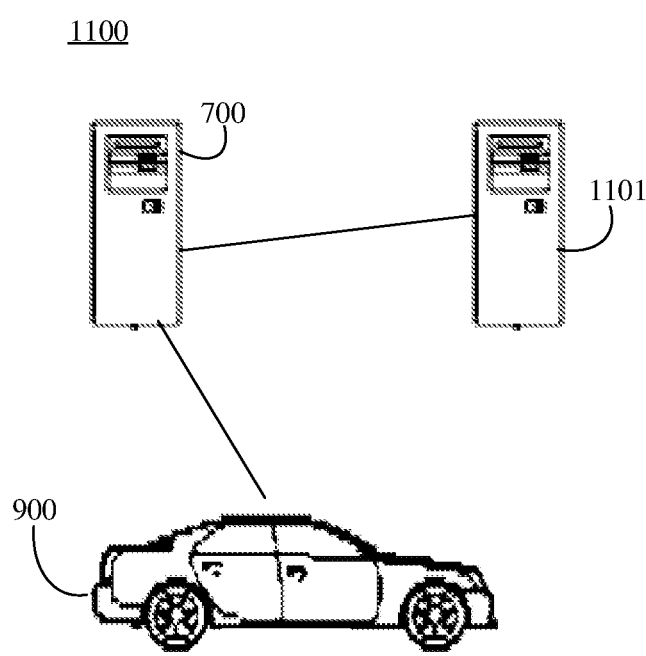
FIG. 11 shows a system 1100 according to an embodiment of this application.

FIG. 11 shows a system 1100 according to an embodiment of this application. The system 1100 includes: the server 700 in the embodiment shown in FIG. 7, the vehicle 900 in the embodiment shown in FIG. 9 and a provider server 1101.

The provider server 1101 correspond to the provider in the above-mentioned embodiments, and the foregoing and other management operations and/or functions of the provider server 1101 are separately used to implement corresponding steps of the foregoing methods. For brevity, details are not described herein again.

An embodiment of this application further provides a computer storage medium, where the computer storage medium may store a program instruction for performing any of the foregoing methods.

Optionally, the storage medium may be specifically the memory 803 or the memory 1003.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for managing software versions of electronic device(s) in a vehicle, comprising:
   transmitting, by a server, an update bundle to a target vehicle, wherein the update bundle comprises N patches, the N patches being in one-to-one correspondence with N electronic devices in the target vehicle, each patch of the N patches being used to update software of a corresponding electronic device, N being a positive integer greater than or equal to 1;
   receiving, by the server, an update response from the target vehicle, the update response indicates one or more patches which have been successfully installed among the N patches; and
   updating, by the server, a vehicle version tree (VVT), corresponding to the target vehicle according to the update response to obtain an updated VVT, wherein the updated VVT comprises multiple pieces of a first software information corresponding to the N electronic devices in the target vehicle, each of the multiple pieces of the first software information comprises identity information of an electronic device among the N electronic devices in the target vehicle and a current software version number of the electronic device in the target vehicle, wherein, before transmitting the update bundle to the target vehicle, the method further comprises:

updating, by the server, a global version tree (GVT) corresponding to a vehicle of a target model according to M patches to obtain an updated GVT, wherein the M patches are in one-to-one correspondence with M electronic devices in the vehicle of the target model, M is a positive integer greater than or equal to 1, the updated GVT comprises multiple pieces of a second software information, each piece of the multiple pieces of the second software information comprises identity information of an electronic device in the vehicle of the target model and a latest software version number of the electronic device in the vehicle of the target model, a model of the target vehicle is the target model; and determining, by the server, the update bundle according to the updated GVT, wherein the M patches comprise the N patches.

2. The method according to claim 1, further comprising:
determining VVT information according to the updated VVT, wherein the VVT information indicates the multiple pieces of the first software information comprised in the updated VVT; and
transmitting the VVT information to the target vehicle.

3. The method according to claim 2, further comprising:
determining a time stamp corresponding to the VVT information; and
transmitting the time stamp to the target vehicle.

4. The method according to claim 1, wherein the identity information of the electronic device in the target vehicle comprises: a first piece of identity information, a second piece of identity information and a third piece of identity information, wherein the first piece of identity information indicates an identity of a manufacturer of the electronic device in the target vehicle, the second piece of identity information indicates an identity of a type of the electronic device in the target vehicle, and the third piece of identity information indicates the electronic device in the target vehicle.

5. The method according to claim 1, wherein, before transmitting the update bundle to the target vehicle, the method further comprises:
receiving, by the server, the M patches from M providers; and
storing, by the server, the M patches.

6. The method according to claim 5, the determining the update bundle according to the updated GVT comprises:
determining the N electronic devices according to the VVT and the updated GVT, wherein software version numbers of any one of the N electronic devices in the VVT are different from software version numbers of the respective electronic device in the updated GVT; and
determining the update bundle, wherein software version numbers of the N electronic devices in the VVT and in the updated GVT are different.

7. The method according to claim 5, wherein, before determining the update bundle according to the updated GVT, the method further comprises:
determining, by the server, the M patches comprise at least one critical patch,
and determining the update bundle comprises:
determining that the update bundle comprises the at least one critical patch.

8. The method according to claim 5, wherein the identity information of an electronic device in the vehicle of the target model comprises: a fourth piece of identity information, a fifth piece of identity information and a sixth piece of identity information, wherein the fourth piece of identity information indicates an identity of a manufacturer of the electronic device in the vehicle of the target model, the fifth piece of identity information indicates an identity of a type of the electronic device in the vehicle of the target model, and the sixth piece of identity information indicates the electronic device in the vehicle of the target model.

9. A system, comprising a server and a vehicle, wherein
the server comprises a memory and at least one processor, the memory stores instructions that, when executed by the at least one processor, cause the server to transmit an update bundle to the vehicle, and the update bundle comprises N patches, the N patches being in one-to-one correspondence with N electronic devices in the vehicle, each patch of the N patches being used to update software of a corresponding electronic device, and N being a positive integer greater than or equal to 1;

the vehicle is configured to receive the update bundle from the server and transmit an update response to the server, and the update response indicates one or more patches which have been successful installed among the N patches; and the instructions, when executed by the at least one processor, further cause the server to receive the update response from the vehicle and update a vehicle version tree (VVT), corresponding to the vehicle according to the update response to obtain an updated VVT, and the updated VVT comprises multiple pieces of a first software information corresponding to the N electronic devices in the vehicle, each of the multiple pieces of the first software information comprises identity information of an electronic device among the N electronic devices in the vehicle and a current software version number of the electronic device in the vehicle, wherein, a model of the vehicle is a target model, and the instructions, when executed by the at least one processor, further cause the server to:

update a global version tree (GVT) corresponding to a vehicle of the target model according to M patches to obtain an updated GVT, wherein the M patches are in one-to-one correspondence with M electronic devices in the vehicle of the target model, M is a positive integer greater than or equal to 1, the updated GVT comprises multiple pieces of a second software information, and each piece of multiple pieces of the second software information comprises identity information of an electronic device in the vehicle of the target model and a latest software version number of the electronic device in the vehicle of the target model, and determine the update bundle according to the updated GVT, wherein the M patches comprise the N patches.

10. The system according to claim 9, wherein the instructions, when executed by the at least one processor, further cause the server to determine VVT information according to the updated VVT and transmit the VVT information to the vehicle, wherein the VVT information indicates the multiple pieces of the first software information comprised in the updated VVT; and the vehicle is further configured to obtain the VVT information from the server and store the VVT information.

11. The system according to claim 10, wherein the instructions, when executed by the at least one processor, further cause the server to determine a time stamp corresponding to the VVT information and transmit the time stamp to the vehicle; and the vehicle is further configured to obtain and store the time stamp.

12. The system according to claim 9, wherein the identity information of the electronic device in the vehicle comprises: a first piece of identity information, a second piece of identity information and a third piece of identity information, wherein the first piece of identity information indicates an identity of a manufacturer of the electronic device in the vehicle, the second piece of identity information indicates an identity of a type of the electronic device in the vehicle, and the third piece of identity information indicates the electronic device in the vehicle.

13. The system according to claim 9, wherein, a model of the vehicle is a target model, the instructions, when executed by the at least one processor, further cause the server to:
receive the M patches from M providers, and
store the M patches.

14. The system according to claim 13, wherein the instructions, when executed by the at least one processor, further cause the server to:
determine the N electronic devices according to the VVT and the updated GVT, wherein software version numbers of any one of the N electronic devices in the VVT are different from software version numbers of the respective electronic device in the updated GVT; and
determine the update bundle, wherein software version numbers of the N electronic devices in the VVT and in the updated GVT are different.

15. A server, comprising a memory and at least one processor, wherein
the memory is configured to store a computer program, and the at least one processor is configured to execute the computer program from the memory to cause the server to:
transmit an update bundle to a target vehicle, wherein the update bundle comprises N patches, the N patches being in one-to-one correspondence with N electronic devices in the target vehicle, each patch of the N patches being used to update software of a corresponding electronic device, N being a positive integer greater than or equal to 1;
receive an update response from the target vehicle, wherein the update response indicates one or more patches which have been successfully installed among the N patches; and
update a vehicle version tree (VVT), corresponding to the target vehicle according to the update response to obtain an updated VVT, wherein the updated VVT comprises multiple pieces of a first software information corresponding to the N electronic devices in the target vehicle, each of the multiple pieces of the first software information comprises identity information of an electronic device among the N electronic devices in the target vehicle and a current software version number of the electronic device in the target vehicle, wherein the at least one processor is further configured to execute the computer program from the memory to cause the server to:
update a global version tree (GVT), corresponding to a vehicle of a target model according to M patches to obtain an updated GVT, wherein the M patches are in one-to-one correspondence with M electronic devices in the vehicle of the target model, M is a positive integer greater than or equal to 1, the updated GVT comprises multiple pieces of a second software information, and each piece of the multiple pieces of the second software information comprises identity information of an electronic device in the vehicle of the target model and a latest software version number of the electronic device in the vehicle of the target model, a model of the target vehicle is the target model; and
determine the update bundle according to the updated GVT, wherein the M patches comprise the N patches.

16. The server according to claim 15, wherein the at least one processor is further configured to execute the computer program from the memory to cause the server to:
determine VVT information according to the updated VVT, wherein the VVT information indicates the multiple pieces of the first software information comprised in the updated VVT; and
transmit the VVT information to the target vehicle.

17. The server according to claim 16, wherein the at least one processor is further configured to execute the computer program from the memory to cause the server to:
determine a time stamp corresponding to the VVT information; and
transmit the time stamp to the target vehicle.

18. The server according to claim 15, wherein the identity information of the electronic device in the target vehicle comprises: a first piece of identity information, a second piece of identity information and a third piece of identity information, wherein the first piece of identity information indicates an identity of a manufacturer of the electronic device in the target vehicle, the second piece of identity information indicates an identity of a type of the electronic device in the target vehicle, and the third piece of identity information indicates the electronic device in the target vehicle.

19. The server according to claim 15, wherein the at least one processor is further configured to execute the computer program from the memory to cause the server to:
receive the M patches from M providers; and
store the M patches.

20. The server according to claim 19, wherein the at least one processor is configured to execute the computer program from the memory to cause the server to:
determine the N electronic devices according to the VVT and the updated GVT, wherein software version numbers of any one of the N electronic devices in the VVT are different from software version numbers of the respective electronic device in the updated GVT; and
determine the update bundle, wherein software version numbers of the N electronic devices in the VVT and in the updated GVT are different.

* * * * *